United States Patent
Sturgill et al.

(10) Patent No.: US 11,535,769 B1
(45) Date of Patent: Dec. 27, 2022

(54) SOLVENT FREE VINYL PLASTISOL COMPOSITION

(71) Applicant: Henkel AG & Co. KGaA, Duesseldorf (DE)

(72) Inventors: David Sturgill, Brookfield, WI (US); Corina Bisog, Franklin, WI (US); Joshua Harju, Greenfield, WI (US)

(73) Assignee: Henkel AG & Co. KGaA, Duesseldorf (DE)

(*) Notice: Subject to any disclaimer, the term of this patent is extended or adjusted under 35 U.S.C. 154(b) by 153 days.

(21) Appl. No.: 15/393,555

(22) Filed: Dec. 29, 2016

(51) Int. Cl.
| | |
|---|---|
| C09D 127/06 | (2006.01) |
| C09D 7/20 | (2018.01) |
| C08K 5/12 | (2006.01) |
| C08K 3/26 | (2006.01) |
| C08K 3/36 | (2006.01) |

(52) U.S. Cl.
CPC ............ C09D 127/06 (2013.01); C09D 7/20 (2018.01); *C08K 3/26* (2013.01); *C08K 3/36* (2013.01); *C08K 5/12* (2013.01); *C08K 2003/265* (2013.01)

(58) Field of Classification Search
CPC .......... C09D 127/06; C09D 7/20; B05D 1/02; B05D 3/007; C08K 3/26; C08K 3/36; C08K 5/12; C08K 2003/265
See application file for complete search history.

(56) References Cited

U.S. PATENT DOCUMENTS

| | | | |
|---|---|---|---|
| 3,247,158 A * | 4/1966 | Alford .................. | C08J 9/32 524/494 |
| 4,254,006 A * | 3/1981 | Robertson ............ | C09D 127/06 427/389.7 |
| 4,376,512 A * | 3/1983 | Kistner ............... | B05B 12/1418 239/106 |
| 8,586,777 B2 | 11/2013 | Zhou et al. | |
| 8,906,991 B2 | 12/2014 | Donate et al. | |
| 2004/0034143 A1* | 2/2004 | Hubert .................. | C08L 27/06 524/418 |
| 2004/0242748 A1* | 12/2004 | Takahashi ............ | C09C 1/021 524/425 |
| 2007/0037929 A1* | 2/2007 | Joo ......................... | C08L 27/06 525/191 |
| 2012/0259049 A1* | 10/2012 | Donate .................. | C09D 7/20 524/290 |
| 2014/0243446 A1 | 8/2014 | Turk et al. | |

FOREIGN PATENT DOCUMENTS

| | | |
|---|---|---|
| JP | 08-127692 | * 12/2008 |
| RU | 2214438 C1 | 10/2003 |
| WO | 2006077131 A1 | 7/2006 |
| WO | 2009097142 A1 | 8/2009 |
| WO | 2013123127 A1 | 8/2013 |

OTHER PUBLICATIONS

Machine translation of JP 08-127692, retrieved Feb. 9, 2019.*
Gelest Silane coupling agents NPL document, retrieved Sep. 9, 2021.*

* cited by examiner

*Primary Examiner* — Michael B Nelson

(74) *Attorney, Agent, or Firm* — Mary K. Cameron

(57) ABSTRACT

Disclosed is a heat curable solvent free plastisol composition that exhibits very low volatile organic compound amounts while maintaining high performance characteristics. The present plastisol compositions have solvent substitutes used at amounts up to 15% by weight based on the total composition weight. The solvent substitutes have very low vapor pressures, stable viscosity effects, and are fusible with the plastisol polymers. These solvent substitutes can be used to replace the typical solvents without requiring extensive re-formulation of the plastisol composition. The final plastisol compositions according to the present invention exhibit low VOC measures of less than 0.03 pounds per gallon when measured according to EPA Method 24.

20 Claims, No Drawings

SOLVENT FREE VINYL PLASTISOL COMPOSITION

RELATED APPLICATIONS

NONE.

STATEMENT REGARDING FEDERALLY SPONSORED RESEARCH

NONE.

TECHNICAL FIELD

This invention relates generally to vinyl plastisol coatings and sealants and more specifically, to these coatings and sealants formed using very low vapor pressure and low viscosity liquids in place of the typical solvents which have a high vapor pressure and a higher viscosity.

BACKGROUND OF THE INVENTION

Vinyl plastisol compositions are used as sealants and coatings in the automotive industry especially in underbody applications and rocker panel applications. The formulations are applied to surfaces and then heat cured at temperatures typically in the range of from 300 to 330° F. Typical vinyl plastisol formulations include use of volatile solvents to reduce viscosity so the plastisol formulations can be pumped, applied and tooled effectively. The commonly used solvents are highly volatile and typical formulations include solvents such as mineral spirits, i.e. petroleum distillates, naphtha (petroleum) heavy alkylates and/or polyglycol ethers, having vapor pressures of greater than 0.10 mm of Hg at 20° C. (equivalent to 0.01333 kPa at 20° C.). There are several common drawbacks with using typical plastisol solvents. These drawbacks include environmental exposure created by their high volatility which can adversely affect workers and the environment. Their use requires installation of re-combustion systems in paint ovens to deal with the evaporation of volatile solvents, which adds expense to the paint ovens and requires maintenance and testing of the re-combustion systems to ensure environmental compliance. The plastisol compositions containing volatile organic solvents such as mineral spirits and polyglycol ethers require special handling and labeling because of the inclusion of these solvents. Typically these plastisol compositions exhibit volatile organic compound (VOC) amounts of 0.12 to 0.6 pounds per gallon when measured according to the Environmental Protection Agency (EPA) Method 24. When the plastisol compositions have been applied to surfaces to be sealed or coated, the plastisols are then typically dried in the paint ovens, where the higher temperature causes release of solvent into the oven atmosphere. Solvent entering the oven atmosphere has several drawbacks, depending on the amount present. One drawback is that the evaporated solvent may condense on surfaces in paint oven cooling zones which can create issues with paint defect problems caused by liquid dripping in the paint oven cooling zones. Another drawback is that the evaporated solvent can form opaque aerosols or vapors that escape from oven exhaust and exit tunnels, which is undesirable from an environmental standpoint.

It is desirable to avoid or diminish the above described drawbacks. It is desirable to provide heat curable plastisol compositions that have VOC amounts less than those typically found in current plastisol compositions, while maintaining the same performance characteristics of the plastisol compositions having greater amounts of VOC's. It is also desirable to provide heat curable plastisol compositions that are free of solvents containing volatile organic compounds (VOC). In the present specification and claims the term VOC means hydrocarbon compounds having a vapor pressure of greater than or equal to 0.1 mm of Hg (at 20° C.).

SUMMARY OF THE INVENTION

In general terms, this invention provides heat curable solvent free plastisol compositions that exhibit very low VOC amounts as measured by EPA Method 24 yet retain the high performance characteristics and workability of plastisol compositions containing the high VOC solvents.

In one embodiment the present invention is a heat curable low volatile organic compound plastisol composition comprising: at least one of a polyvinyl chloride polymer, a polyvinyl chloride polyvinyl acetate co-polymer, and mixtures thereof; a solvent substitute comprising at least one adipate having a vapor pressure at 20° C. of less than or equal to 0.0001 mm of Hg; and wherein the plastisol composition has a volatile organic compound (VOC) amount of less than 0.03 pounds per gallon.

In another embodiment the present invention is a method of coating a substrate with a low volatile organic compound plastisol composition comprising the steps of: a) providing a substrate having a surface; b) providing a low volatile organic compound plastisol composition comprising: at least one of a polyvinyl chloride polymer, a polyvinyl chloride polyvinyl acetate co-polymer, and mixtures thereof; a solvent substitute comprising at least one adipate having a vapor pressure at 20° C. of less than or equal to 0.0001 mm of Hg; and wherein the plastisol composition has a volatile organic compound (VOC) amount of less than 0.03 pounds per gallon; c) applying a coating of the plastisol composition to at least a portion of the surface of the substrate by at least one of spraying, dip molding, slush molding, rotational molding, casting, screen printing, or a mixture thereof; and d) curing the coating.

In another embodiment the present invention is a substrate coated with a plastisol composition according to the present invention.

These and other features and advantages of this invention will become more apparent to those skilled in the art from the detailed description of a preferred embodiment.

DETAILED DESCRIPTION OF A PREFERRED EMBODIMENT

The present invention is directed toward heat curable solvent-free plastisol compositions that exhibit very low VOC amounts as measured by EPA Method 24 yet retain the high performance characteristics and workability of plastisol compositions containing the high VOC solvents. The compositions according to the present invention have VOC amounts according to EPA Method 24 of less than 0.03 pounds/gallon, which is far below the amounts of 0.12 to 0.6 pounds/gallon found in typical plastisol compositions. In the present invention the composition preferably contains less than 0.1, more preferably less than 0.05, and most preferably less than 0.03 pounds/gallon of volatile organic compound-containing solvents.

The compositions comprise solvent substitute materials which are liquids at room temperature, meaning 25° C., and have low vapor pressures, for example approximately less than 0.1 to less than 0.000001 mm Hg at 20° C. These solvent substitute liquids provide the same performance characteristics without the drawbacks of having amounts of VOCs in the composition of greater than 0.05 pounds/gallon.

The plastisol compositions according to the present invention may include one or more of additives such as plasticizers, fillers, colorants, adhesion promotors, fungicides, anti-oxidants, silica, and fusible low vapor pressure additives.

The plastisol compositions according to the present invention are used at coating application film amounts of from 100 microns thick to 4 millimeters thick. The plastisol compositions can be used to coat a wide variety of substrate surfaces, for example in vehicle underbodies, rocker panels, trunk seams, and similar surfaces which are subjected to baking, ovening or heat curing. The compositions according to the invention are generally applied by spraying; however, plastisol coatings according to the present invention can also be applied by the known methods of dip molding, slush molding, rotational molding, casting, and screen printing.

The plastisol composition according to the present invention includes as a component one or more polyvinyl chloride (PVC) homopolymers or co-polymers formed from vinyl chloride monomer; co-polymers may comprise up to 15% by weight based on the total weight of the co-polymer of vinyl acetate monomer. The overall amount of the polyvinyl chloride homopolymer or co-polymer with vinyl acetate monomer in compositions according to the invention may range from 15 to 40% by weight based on the total weight of the plastisol composition, preferably from 25 to 35% by weight.

The plastisol composition according to the present invention includes one or more plasticizers, desirably one or more phthalate plasticizers. In one embodiment the plasticizer is selected from di-R phthalate plasticizers wherein R represents linear or branched hydrocarbon chains having from 6 to 11 carbon atoms, for example diisononyl phthalate, and non-phthalate plasticizers such as di-octyl terephthalate. In the present specification and claims the term hydrocarbon means an organic compound consisting of only carbon and hydrogen. The one or more plasticizers are preferably present in the plastisol composition at a total amount of from 25 to 50% by weight based on the total weight of the plastisol composition, more preferably from 30 to 40%.

The plastisol composition according to the present invention can include one or more fillers such as: glass spheres; plastic balloons; mineral fillers, e.g. calcium oxide, talc or calcium carbonate; and the like. Preferably the fillers are used in amounts of from 10 to 40% by weight based on the total weight of the plastisol composition, more preferably at an amount of from 25 to 35%.

The plastisol composition according to the present invention can include one or more precipitated calcium carbonates coated with fatty acids such as stearic acid, oleic acid, or palmitic acid. Preferably these precipitated calcium carbonates are used at amounts of from 10 to 40% by weight based on the total weight of the plastisol composition, more preferably in an amount of from 12 to 22%.

The plastisol composition according to the present invention can include one or more adhesion promotors such as polyamides, epoxy compounds, urethanes, anhydrides or silanes. Preferably these adhesion promotors are used at a total amount of from 0.5 to 6% by weight based on the total weight of the plastisol composition, more preferably in an amount of from 1 to 3%.

The plastisol composition according to the present invention can include fumed silica, present in a non-zero amount up to 5% by weight based on the total weight of the plastisol composition, more preferably in an amount of from 1 to 3%.

The plastisol composition according to the present invention can include one or more common additives such as fungicides, anti-oxidants, moisture scavengers, and pigments.

It is increasingly preferred in the order given, independently for each preferably minimized ingredient listed below, that the plastisol compositions according to the invention, contain no more than 1.0, 0.5, 0.35, 0.10, 0.08, 0.04, 0.02, 0.01, 0.001, or 0.0002 percent, more preferably said numerical values in grams per liter, of solvents having a vapor pressure of greater than or equal to 0.1 mm Hg at 20° C.

The plastisol composition according to the present invention uses in place of solvents containing volatile organic compound (VOC), one or more solvent substitutes comprising a polyvinyl chloride compatible, low vapor pressure, fusible liquid. These liquids desirably have vapor pressures of less than 0.1 mm Hg at 20° C., desirably less than 0.01, 0.001, 0.0001, 0.00001, 0.000001 mm Hg at 20° C. Desirably the solvent substitute has a vapor pressure at 180° C. of less than, in increasing order of preference, about 0.08, 0.07, 0.06, 0.05, or 0.04 mm Hg; and the solvent substitute has a vapor pressure at 20° C. of less than 0.001 mm Hg and more preferably less than 0.0001 mm Hg.

In one embodiment, the solvent substitute has a vapor pressure of less than 0.0001 mm Hg at 20° C., which is 1000 times less than typical mineral spirits or polyglycol ether solvents.

A variety of organic liquids have low vapor pressure, but are not compatible with polyvinyl chloride polymers or are not suitable for industrial application as a sealant which is subsequently baked. Desirably, the solvent substitute may be fusible with the PVC polymers or co-polymers. The solvent substitute does not exude from the as-applied plastisol composition, particularly at elevated temperature. Desirably, the compositions show no exudation after baking at 280° F. for 20 minutes and more preferably no exudation after baking at 240° F. for 20 minutes.

Suitable solvent substitutes are those materials comprising one or more derivatives, polymers or co-polymers of adipic acid, adipates, especially adipate esters. Examples include, bis(2-ethylhexyl) adipate (CAS no. 103-23-1), bis[1-(1-butoxypropan-2yloxy)propan-2-yl]hexanedioate (CAS no. 189047-80-1), dioctyl adipate (CAS no. 123-79-5), polyalkylene glycol adipate derivatives and co-polymers, such as bis-dipropylene glycol n-butyl ether adipate, polyester adipates, polymeric adipate esters, adipate esters with polymeric chains that can include ether functions and mixtures of these liquids. These materials substitute for the typical solvents used in plastisol compositions; however they are not typical "solvents" in that they do not necessarily solvate the plastisol compositions or its components. Instead they may function as a diluent in the plastisol composition. The suitable solvent substitute materials are substantially free of aliphatic, alicyclic and aromatic $C_7$ to $C_{12}$ hydrocarbons. These materials all include an adipate core with ester linkages to polymeric chains extending from the core. The polymeric chains can include mixtures of ester linkages, ether linkages and hydrocarbon sections as in the examples described above. A general formula is $R^1$—COO—$(CH_2)_4$—COO—$R^2$ wherein the $R^1$ and $R^2$ can independently include additional ester functions, ether functions, hydrocarbon sections and mixtures of these. Preferably these liquids are used in non-zero amounts up to 15% by weight based on the total weight of the plastisol composition, more preferably 0.5 to 8% by weight. The suitable solvent substitutes are liquids at 25° C.

The polymeric adipates suitable for use in the present invention, described above, preferably have a molecular weight range of from 300 to 1000 grams per mole.

In a preferred embodiment, the solvent substitute has a vapor pressure at 180° C. of less than 0.08 mm Hg, more preferably less than 0.04 mm Hg; and the solvent substitute has a vapor pressure at 20° C. of less than 0.001 mm Hg and more preferably less than 0.0001 mm Hg.

The solvent substitutes suitable for the present invention preferably have a Newtonian viscosity at 25° C. of from 10 to 100 centipoise (cP), more preferably from 10 to 50 cP. Preferably, the solvent substitute has a stable viscosity in the plastisol formulation. Stable viscosity in the plastisol formulation, as used herein means that a plastisol composition that has been aged for 3 days at 40° C. must have an increase in viscosity of less than 50% when compared to the plastisol formulation's initial viscosity. More preferably, initial viscosity of the plastisol composition will have increased by less than 25% after 3 days at 40° C.

EXAMPLES

A series of examples are given below and include use of a polyglycol adipate co-polymer, specifically bis-dipropylene glycol n-butyl ether adipate, and a mixture of this polyglycol adipate and a polyester adipate as examples of the liquid solvent substitute. The polyglycol adipate was used at amounts of from 1.0 to 7.1% by weight. The polyester adipate was used in an amount of 5.0% by weight. The formulations are provided below in Table 1 with all the components recited in % by weight based on the total formulation weight. All the components were combined together with mixing to produce the plastisol compositions.

Exudation was measured in a number of ways. In one method the plastisol composition was placed in a cylinder and pressurized to 3000 psi and held at that pressure for 72 hours. After 72 hours the pressure was relieved and the amount of liquid separation was measured. In another method, a thin bead of approximately ⅛" in width of the plastisol composition was extruded onto a test substrate panel. The panel was hung vertically for 24 hours and the amount of liquid dripping down the panel or collected at the tip of the bead was observed.

TABLE 1

| Component | Example 1, % by weight | Example 2, % by weight | Example 3, % by weight |
|---|---|---|---|
| Polyamide resin | 1.4 | 1.2 | 1.4 |
| Polyvinyl chloride vinyl acetate co-polymer #1 | 33.0 | 18.0 | 33.0 |
| Polyvinyl chloride vinyl acetate co-polymer #2 | 1.5 | 15.4 | 1.5 |
| Organic coated precipitated calcium carbonate #1 | 11.9 | 0.0 | 11.9 |
| Organic coated precipitated calcium carbonate #2 | 4.8 | 0.0 | 4.8 |
| Organic coated precipitated calcium carbonate #3 | 0.0 | 7.0 | 0.0 |
| Organic coated precipitated calcium carbonate #4 | 0.0 | 10.0 | 0.0 |
| Di-octyl terephthalate | 28.5 | 0.0 | 18.0 |
| Diisononylphthalate | 0.0 | 28.5 | 11.6 |
| Polyglycol adipate | 7.1 | 7.1 | 1.0 |
| Polyester adipate | 0.0 | 0.0 | 5.0 |
| Ground calcium carbonate | 5.9 | 7.4 | 5.9 |
| Hollow glass spheres | 1.1 | 0.0 | 1.1 |
| Calcium oxide | 0.7 | 0.7 | 0.7 |
| Lightweight plastic balloons | 4.0 | 4.5 | 4.0 |
| Carbon black | 0.1 | 0.1 | 0.1 |

The plastisol compositions prepared in accordance with Table 1 exhibited no opaque aerosol or vapor formation visible to the unaided human eye at room temperature or upon heating. The plastisol compositions had a volatile organic compound (VOC) amount of less than 0.03 pounds per gallon measured according to EPA Method 24.

In another series of examples the solvent substitute comprised bis-dipropylene glycol n-butyl ether adipate or a polymeric adipate ester having a molecular weight of from 500 to 1000. The example formulations are provided below in Table 2.

TABLE 2

| Component | Example 4, weight % | Example 5, weight % |
|---|---|---|
| Polyamide resin | 1.4 | 1.2 |
| Polyvinylchloride vinyl acetate co-polymer #1 | 33.0 | 18.0 |
| Polyvinylchloride vinyl acetate co-polymer #2 | 1.5 | 15.4 |
| Organic coated precipitated calcium carbonate #1 | 11.9 | 0.0 |
| Organic coated precipitated calcium carbonate #2 | 4.8 | 0.0 |
| Organic coated precipitated calcium carbonate #3 | 0.0 | 7.0 |
| Organic coated precipitated calcium carbonate #4 | 0.0 | 10.0 |
| Di-octyl terephthalate | 28.5 | 0.0 |
| Diisononylphthalate | 0.0 | 28.5 |
| Bis-dipropylene glycol n-butyl ether adipate | 7.1 | 0.0 |
| Polymeric adipate ester Mw 500 to 1000 | 0.0 | 7.1 |
| Ground calcium carbonate | 5.9 | 7.4 |
| Calcium oxide | 0.7 | 0.7 |
| Lightweight plastic balloons | 4.0 | 4.0 |
| Carbon black | 0.1 | 0.1 |

The plastisol compositions prepared in accordance with Table 2 exhibited no opaque aerosol or vapor formation visible to the unaided human eye at room temperature or upon heating. The plastisol compositions had a volatile organic compound (VOC) amount of less than 0.03 pounds per gallon measured according to EPA Method 24, excellent viscosity stability and no exudation.

The present invention is directed to low VOC plastisol compositions that have high performance characteristics despite the absence of typical plastisol solvents. The present plastisol compositions have very reduced VOC amounts and do not produce opaque aerosols or vapors when being applied and more particularly when subjected to elevated temperature such as that of a paint cure oven. In addition, the solvent substitutes have stable viscosities and do not show exudation upon heating of the compositions. The present plastisol compositions have a much lower environmental effect because of use of the solvent substitutes. The present plastisol compositions can be applied to any substrate suitable for plastisol application including: metal substrates, wood substrates, fabric substrates, plastic substrates, glass substrates, and mixtures of these substrates. They are useful in automotive, marine and household goods, particularly goods that are subjected to oven treatment, such as paint curing and the like.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A heat curable, sprayable plastisol composition having a low VOC content, consisting of:
   a plurality of polymers, wherein all polymers in said plastisol composition are selected from the group consisting of liquid polymeric adipate solvent substitutes, plasticizers, polyvinyl chloride polyvinyl acetate copolymers of vinyl chloride and vinyl acetate, and optionally, plastic balloons;
   wherein said one or more liquid polymeric adipate solvent substitutes have a vapor pressure at 20° C. of less than or equal to 0.0001 mm of Hg, each having a formula of $R^1$—COO—$(CH_2)_4$—COO—$R^2$ wherein $R^1$ and $R^2$ independently include one or more of an ether function, an ester function, a hydrocarbon, or a mixture thereof, and wherein said one or more liquid polymeric adipate solvent substitutes each have a molecular weight of from 300 to 1000, and said one or more liquid polymeric adipate solvent substitutes are present in a non-zero amount of up to 15% by weight based on the total weight of the plastisol composition;
   said plasticizers are plasticizers selected from the group consisting of di-R phthalate plasticizers wherein R are linear or branched $C_6$ to $C_{11}$ hydrocarbon chains, di-octyl terephthalate, and mixtures thereof, and said plasticizers are present in a total amount of from 25 to 40 percent by weight based on the total weight of the plastisol composition;
   said polyvinyl chloride polyvinyl acetate copolymers contain units derived from vinyl acetate in a non-zero amount of up to 15% by weight based on the weight of the polyvinyl chloride polyvinyl acetate copolymers, and said polyvinyl chloride polyvinyl acetate copolymers are present in an amount of 15 to 40% by weight based on the total weight of the sprayable plastisol composition;
   wherein said plastisol composition optionally further consists of one or more fillers, colorants, adhesion promotors selected from the group consisting of polyamides, epoxy compounds, urethanes, anhydrides, silanes, and mixtures thereof, fungicides, anti-oxidants, and/or silica, and said plastisol composition has a VOC content according to EPA Method 24 of less than 0.03 pounds per gallon.

2. The plastisol composition of claim 1 wherein the one or more liquid polymeric adipate solvent substitutes each have a Newtonian viscosity at 25° C. of 10 to 100 centipoise (cP).

3. The plastisol composition of claim 1 wherein the one or more liquid polymeric adipate solvent substitutes each have a vapor pressure at 180° C. of less than 0.08 mm Hg.

4. The plastisol composition of claim 1 wherein the one or more liquid polymeric adipate solvent substitutes have molecular weights between 500 and 1000.

5. The plastisol composition of claim 1 wherein the polyvinyl chloride polyvinyl acetate copolymers are present in an amount of from 25 to 35 percent by weight based on a total weight of the plastisol composition.

6. The plastisol composition of claim 1 further consisting of at least one filler selected from the group consisting of glass spheres; mineral fillers; and combinations thereof, in an amount of from 10 to 40 percent by weight based on the total weight of the plastisol composition.

7. The plastisol composition of claim 6, which contains from 12 to 22 weight percent of mineral fillers, the mineral fillers selected from the group consisting of precipitated calcium carbonate coated with stearic acid, palmitic acid, oleic acid, and combinations thereof.

8. The plastisol composition of claim 1 further consisting of fumed silica present in a non-zero amount of up to 5.0 percent by weight based on the total weight of the plastisol composition.

9. The plastisol composition of claim 1, wherein the liquid polymeric adipate solvent substitutes are present in an amount of from 0.5 to 8 weight percent, based on the total weight of the plastisol composition.

10. The plastisol composition of claim 1 wherein said one or more liquid polymeric adipate solvent substitutes comprises a polyalkylene glycol adipate.

11. The plastisol composition of claim 1 wherein said one or more liquid polymeric adipate solvent substitutes comprises a polyalkylene glycol adipate and further comprises a polyester adipate.

12. The plastisol composition of claim 10 wherein the polyalkylene glycol adipate comprises at least one polypropylene glycol adipate.

13. The plastisol composition of claim 12 wherein the polypropylene glycol adipate comprises bis-dipropylene glycol n-butyl ether adipate.

14. The heat curable, sprayable plastisol composition of claim 1:
   wherein said plastisol composition has a VOC content according to EPA Method 24 of less than 0.01 pounds per gallon.

15. The heat curable, sprayable plastisol composition of claim 14, wherein the one or more liquid polymeric adipate solvent substitutes have a molecular weight of from 500 to 1000.

16. A sprayable, heat curable plastisol composition, consisting of:
   a) 30 to 40 wt. % of one or more plasticizers selected from di-octyl terephthalate, diisononylphthalate and combinations thereof, based on the total weight of the sprayable plastisol composition;
   b) 25 to 35 wt. %, based on the total weight of the sprayable plastisol composition, of one or more vinyl chloride-vinyl acetate copolymers containing vinyl acetate in an amount of up to 15 wt. % based on the total weight of the co-polymer;
   c) one or more adhesion promoters selected from the group consisting of polyamides, epoxy compounds, urethanes, anhydrides and silanes; the one or more adhesion promoters being present in a total amount of 0.5 to 6 wt. %, based on total weight of the sprayable plastisol composition;
   d) 25 to 35 wt. % of one or more fillers selected from glass spheres, plastic balloons, mineral fillers, and combinations thereof, based on total weight of the sprayable plastisol composition;
   wherein said mineral fillers are present in an amount of 12 to 22 wt. % based on the total weight of the plastisol composition, and are precipitated calcium carbonates coated with fatty acids selected from the group consisting of stearic acid, oleic acid, palmitic acid and combinations thereof;

e) 0.5 to 8 wt. % of one or more liquid adipate ester solvent substitutes, each having a vapor pressure of less than or equal to 0.0001 mm Hg at 20° C.; and corresponding to the formula $R^1$—COO—$(CH_2)_4$—COO—$R^2$ wherein $R^1$ and $R^2$ independently include one or more of an ether function, an ester function, a hydrocarbon, or a mixture thereof and wherein said solvent substitutes each have a molecular weight of from 300 to 1000; and f) optionally, fungicides, silica, anti-oxidants, moisture scavengers, and/or pigments;

wherein said sprayable plastisol composition has VOC amounts according to EPA Method 24 of less than 0.03 pounds/gallon and is free of aliphatic, alicyclic and aromatic C7 to C12 hydrocarbons.

17. A substrate surface coated with the plastisol composition of claim 1.

18. A method of coating a substrate with a plastisol composition, comprising the steps of:
  a) providing a substrate having a surface;
  b) providing the plastisol composition of claim 1;
  c) spray applying a coating of the plastisol composition to at least a portion of the surface of the substrate; and
  d) curing the coating.

19. The method of claim 18 wherein the coating is applied at a cured thickness of from 100 microns to 4 millimeters.

20. The method of claim 19 wherein the plastisol composition further consists of one of more of a filler, a precipitated calcium carbonate filler, an adhesion promoter, fumed silica, or a mixture thereof.

* * * * *